Aug. 9, 1955  F. T. TURNER ET AL  2,715,202
ELECTRIC MOTOR SPEED REGULATION
Filed Sept. 7, 1951  7 Sheets-Sheet 2

INVENTORS
F. T. TURNER
L. G. POLLARD
C. R. DEIBERT
BY
M. J. Reynolds
ATTORNEY

Aug. 9, 1955   F. T. TURNER ET AL   2,715,202
ELECTRIC MOTOR SPEED REGULATION
Filed Sept. 7, 1951   7 Sheets-Sheet 4

INVENTORS
F. T. TURNER
L. G. POLLARD
BY   C. R. DEIBERT

M. J. Reynolds
ATTORNEY

Aug. 9, 1955  F. T. TURNER ET AL  2,715,202
ELECTRIC MOTOR SPEED REGULATION
Filed Sept. 7, 1951  7 Sheets-Sheet 6

INVENTORS
F. T. TURNER
L. G. POLLARD
C. R. DEIBERT
BY M. J. Reynolds
ATTORNEY

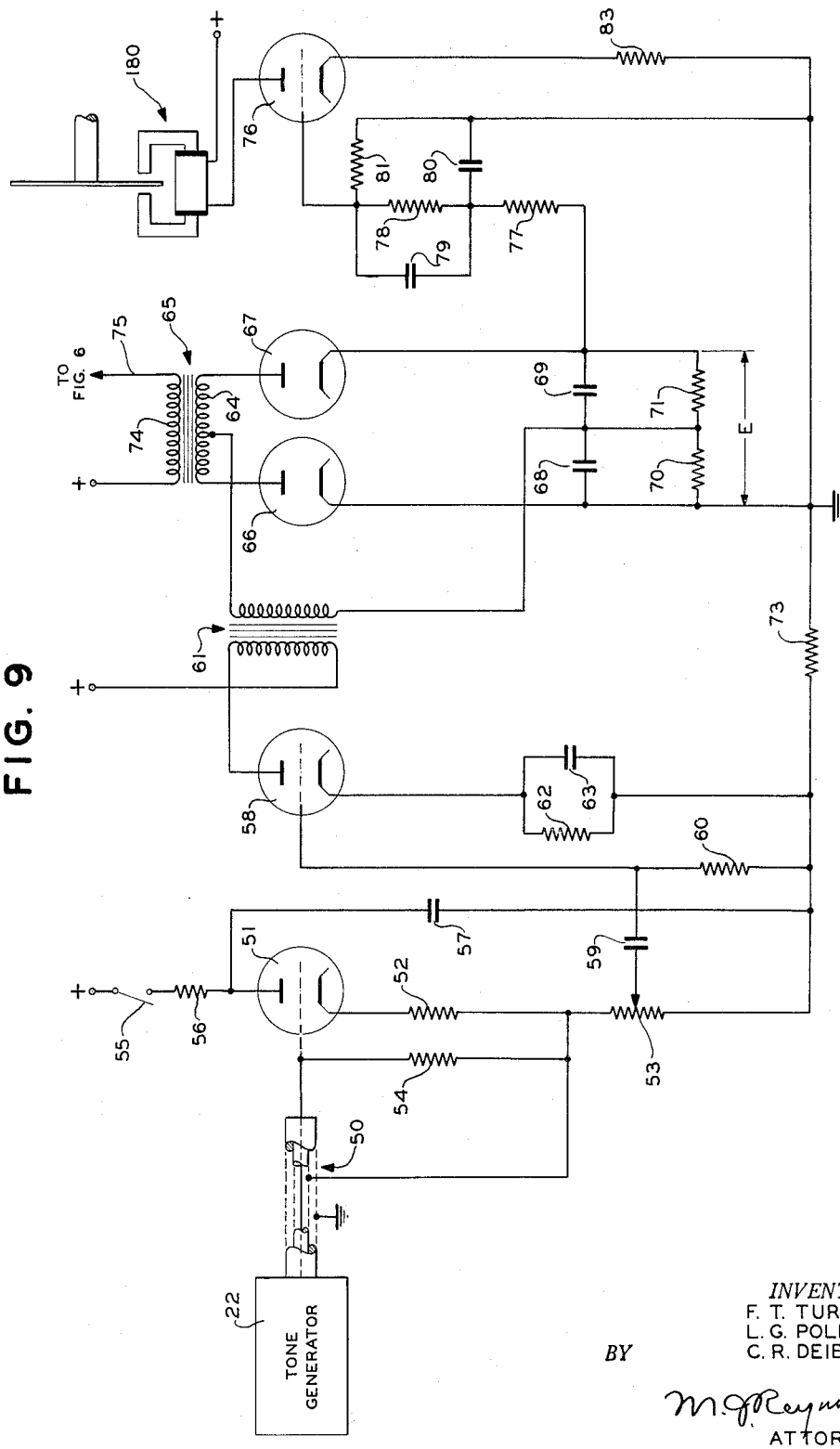

United States Patent Office 2,715,202
Patented Aug. 9, 1955

2,715,202

ELECTRIC MOTOR SPEED REGULATION

Frank T. Turner, Hampton Bays, Leon G. Pollard, Southampton, and Clarence R. Deibert, Water Mill, N. Y., assignors to The Western Union Telegraph Company, New York, N. Y., a corporation of New York Application September 7, 1951, Serial No. 245,544

14 Claims. (Cl. 318—175)

The present invention relates to speed regulation of electric motors and more particularly to the maintenance of constant speed and constant relative angular displacement of electric motors.

For many purposes it is desirable to provide a constant speed electric drive. The requirements of most applications are satisfactorily met through the use of a synchronous motor. While a synchronous motor rotates at a constant speed, the relative angular displacement of the rotor with respect to the rotating electric field will vary with changes in applied voltage, bearing friction and load. While the applied voltage and load of a synchronous motor can be maintained substantially constant, fluctuations in bearing friction tend to be of a random and unpredictable character and can not conveniently be controlled.

In a number of applications, even slight variations in relative angular displacement of the motor rotor are objectionable. One such application is communication by high-speed facsimile transmission, where any appreciable variation in rotor relative angular displacement produces defective received copy.

In some constant speed applications it is inconvenient to use a synchronous motor. For example, some high-speed facsimile apparatus must be designed to operate at adjustable rotational speeds in orders to match the transmitted frequency bandwidth with the bandwidth of available communication channels. In these applications it is desirable to employ an adjustable speed motor such as an induction motor or a D. C. motor. When using a driving motor other than a synchronous motor, it is necessary to control not only the relative angular displacement of the rotor but also the rotational speed.

Accordingly, it is an object of the invention to provide improved speed control apparatus for electric motors.

More particularly it is an object of the invention to provide apparatus for maintaining substantially constant the rotational speed and relative angular displacement of an electric motor rotor.

Another object of the invention is to provide apparatus for maintaining substantially constant the relative angular displacement of a synchronous motor rotor.

A further object of the invention is to provide apparatus for maintaining substantially constant the speed and relative angular displacement of an adjustable speed motor rotor.

Still another object of the invention is to provide a constant speed drive for facsimile transmitters and receivers.

Further objects of the invention will appear from the following description.

In accordance with the invention, these objects are achieved by providing an electric motor and a source of an ideal rotating electric field, generating a first signal voltage having an angular velocity proportional to the angular velocity of the motor rotor and a phase proportional to the angular position of the motor rotor relative to the angular position of the ideal rotating field, generating a second signal voltage having a frequency and phase proportional to the frequency and phase, respectively, of the ideal rotating field, comparing the phases of the first and second signal voltages to produce a third signal voltage having a magnitude proportional to the phase difference between the first and second signal voltages and a polarity dependent on the time relationship between the first and second signal voltages, and providing apparatus responsive to the third signal voltage to adjust the angular position of the motor rotor relative to the angular position of the ideal rotating field whereby the relationship between the angular velocities and relative angular positions, respectively, of the motor rotor and the ideal rotating filed are maintained substantially constant.

For convenience the invention will be described with reference to high-speed facsimile communication equipment, although it is to be understood that it is equally applicable to other apparatus having similar requirements.

The invention will now be described in greater detail with reference to the appended drawing in which:

Fig. 9 shows in detail a motor stabilization circuit for use in the system of Fig. 7.

Figure 1:
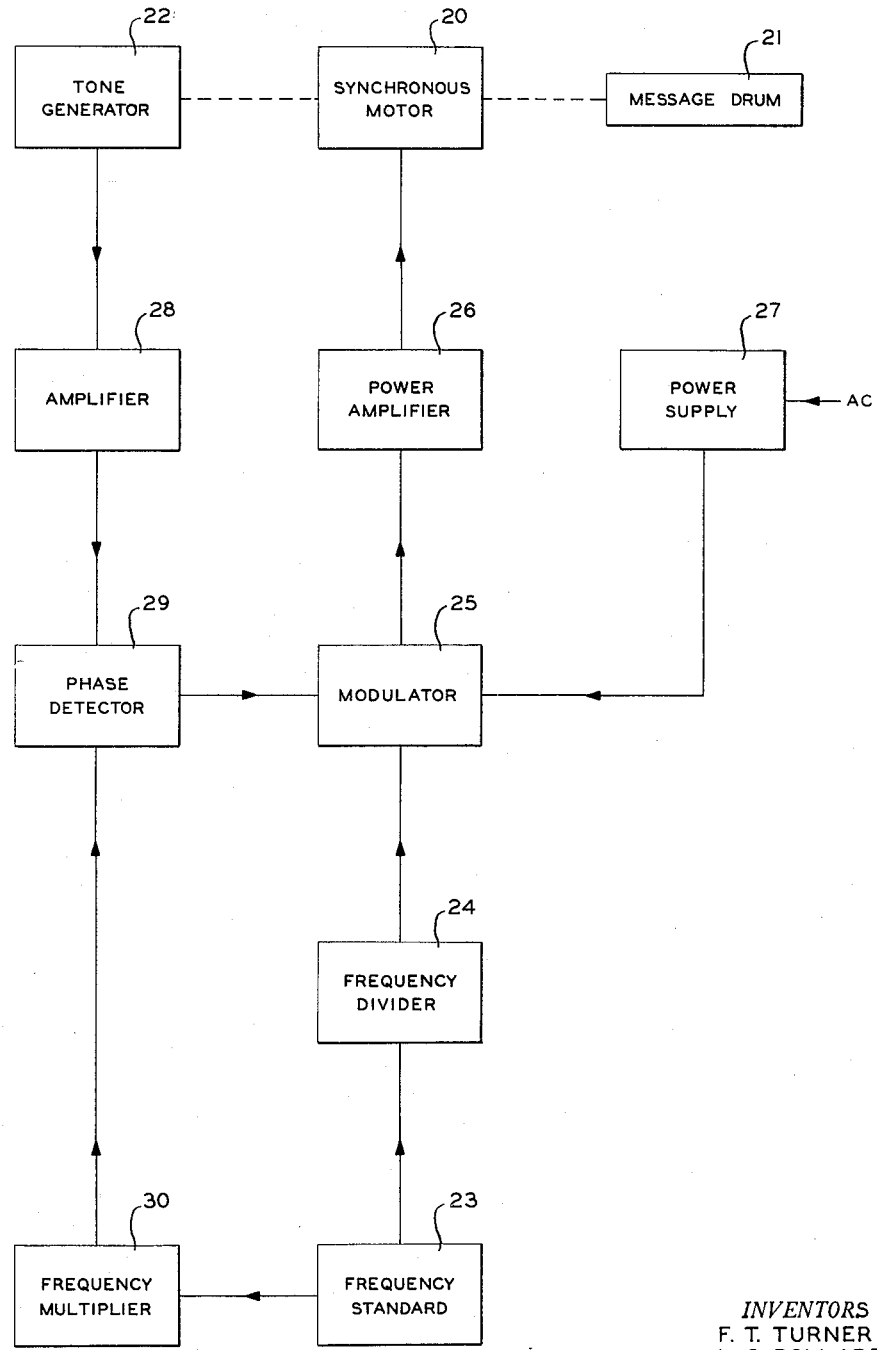
Fig. 1 is a block diagram of a first control system, in accordance with the invention, for use in a facsimile transmitter.

Referring now to the drawing, and more particularly to Fig. 1, a synchronous motor 20 is arranged to drive a transmitter or receiver message drum 21. In some facsimile apparatus, such as a transmitter or receiver of the flat bed type, message drum 21 would be replaced with the scanning or recording stylus drive. Motor 20 also drives a tone generator 22, the structure of which will be described more fully hereinafter in connection with Figs. 2 and 3. Motor 20, drum 21 and generator 22 may conveniently be mounted on a single shaft. Alternatively, belt, gear, or other coupling apparatus may be employed.

Frequency standard 23, which may be, for instance, a tuning fork standard, serves as the primary frequency control source for driving motor 20. It is desirable that standard 23 provide a very constant frequency. The output frequency of standard 23, which may be, for instance, 240 cycles, is divided by a frequency divider 24. It is to be understood that the frequency given above and the frequencies and speeds to be mentioned hereinafter are given solely for the purpose of illustration and are not to be considered as limiting. The output of divider 24 should have the proper frequency for driving motor 20 at the desired speed. For instance, if motor 20 is to operate at 1800 R. P. M., the output of divider 24 could conveniently be 60 cycles.

The output of divider 24 is applied to the input of a modulator stage 25, which is, in turn, coupled to a power amplifier 26, the output of which drives motor 20. As indicated hereinbefore, the relative phase angle of the rotor of motor 20 is highly sensitive to the applied voltage. To maintain this applied voltage constant, modulator 25 should be very stable and is supplied with well regulated operating potentials from a power supply 27. The power input to supply 27 may be from the A. C. mains. Amplifier 26 should likewise be provided with stable operating potentials.

Tone generator 22, being driven by a synchronous motor, will have a constant frequency output. The phase of this output, however, will be dependent on the relative phase of the rotor of motor 20. The output of generator 22 is amplified in an amplifier 28 and applied to a phase detector 29. The output frequency of tone generator 22 is preferably chosen as a multiple of the frequency of standard 23. A suitable value might be 1440 cycles. The 240 cycle output of standard 23 is multiplied to 1440 cycles in a frequency multiplier 30 and applied to phase detector 29. The 1440 cycle signal applied to detector 29 from amplifier 28 will have a frequency proportional to the angular velocity of the rotating electric field of motor 20 and a phase proportional to the angular position of this rotating electric field. The output of phase detector 29 is an error voltage proportional to the phase difference between the two 1440 cycle input signals to detector 29. Since the phase of the 1440 cycle signal from generator 22 represents the actual relative position of the rotor of motor 20 and since the phase of the 1440 cycle signal from frequency multiplier 30 represents the desired or ideal relative position of the rotor of motor 20, the error voltage output of detector 29 will be proportional to the deviation in rotor position from the ideal position. This error voltage is applied to modulator 25 in a sense to change the output voltage thereof to compensate for the error in rotor position. Since the rotor phase angle of motor 20 is dependent on the voltage applied to motor 20, the change in applied voltage effected by the error voltage will return the rotor of motor 20 substantially to the desired relative position. By making the control system sufficiently sensitive, as will be described hereinafter, the relative position of the rotor of motor 20 may be maintained substantially constant despite fluctuations in bearing friction, load and applied voltage.

Figure 2:
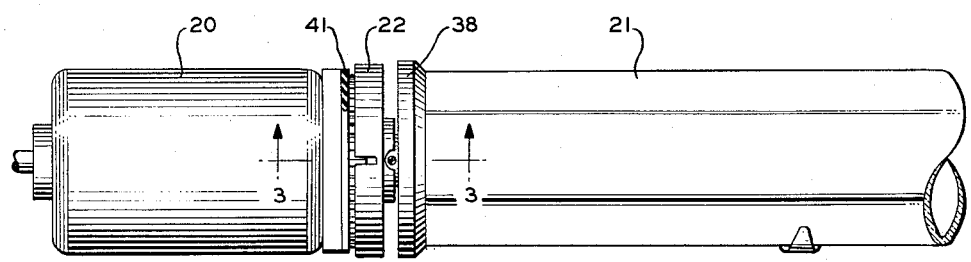
Figs. 2 and 3 illustrate a portion of the mechanical assembly of a facsimile transmitter in accordance with the invention.
Figure 3:
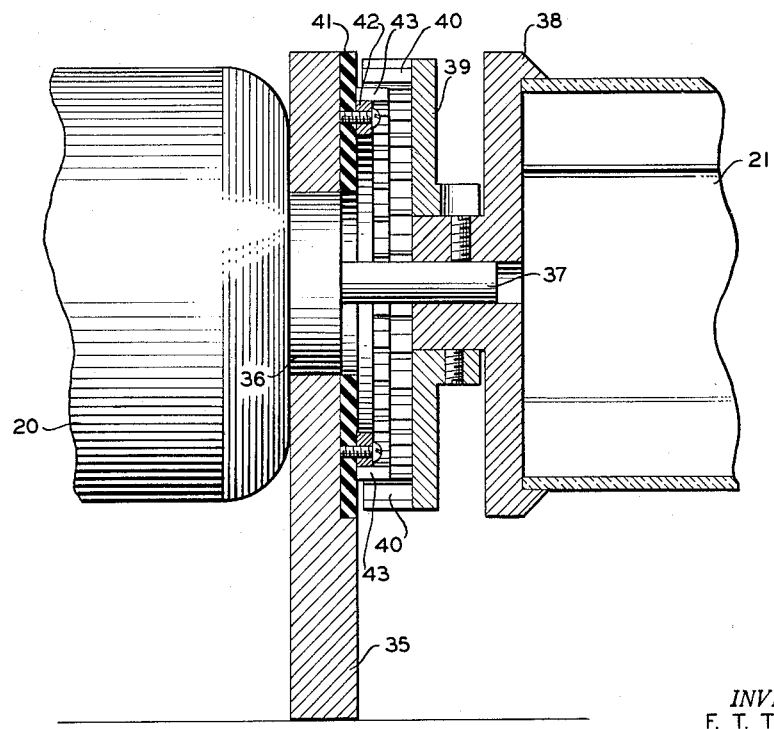

In Fig. 2, which is a plan view of a facsimile transmitter mechanical arrangement, motor 20, tone generator 22 and message drum 21 are directly coupled. The details of tone generator 22 are shown in Fig. 3, which is a sectional view of Fig. 2 taken along a line 3—3. The stator housing of motor 20 is fastened to a frame support member 35 having an aperture therein for bearing 36. Bearing 36 carries a shaft 37 which interconnects the rotor of motor 20 and a hub 38 which closes one end of drum 21. A spider 39 carrying a set of outer teeth 40 is rigidly mounted on a flange projection of hub 38 so that teeth 40 rotate with motor 20 and drum 21. An annular insulating ring 41 is mounted on support member 35. An annular conducting ring 42, fastened to ring 41, carries a set of stationary inner teeth 43.

While teeth sets 40 and 43 do not mesh, they overlap longitudinally so that they constitute, respectively, the rotor and stator members of a capacitive element. The capacity between the sets of teeth will vary with their relative angular orientation, a maximum capacity being provided when the respective teeth are directly opposite each other and a minimum capacity being provided when the respective teeth are at a maximum separation. Rotation of set 40 relative to set 43 will cause a capacity variation at a frequency dependent on the number of teeth and the speed of rotation. If each set has 48 teeth and if set 40 rotates at 1800 R. P. M. (30 R. P. S.), the capacitance variation will occur at a frequency of 1440 cycles.

A potential applied to the rotor and stator members of the capacitive element will cause a charging current to flow therethrough. The frequency of this current will be constant, because the speed of rotation is constant, and, in the example assumed, will have a value of 1440 cycles. The phase of this current will vary with any changes in relative angular position of the rotor of motor 20, so that the phase of the signal derived from tone generator 22 will be proportional to the deviation in rotor angular position from the mean or ideal position. Accordingly, the signal derived from tone generator 22 may be used as a measure of deviations in rotor angular position.

Figure 4:
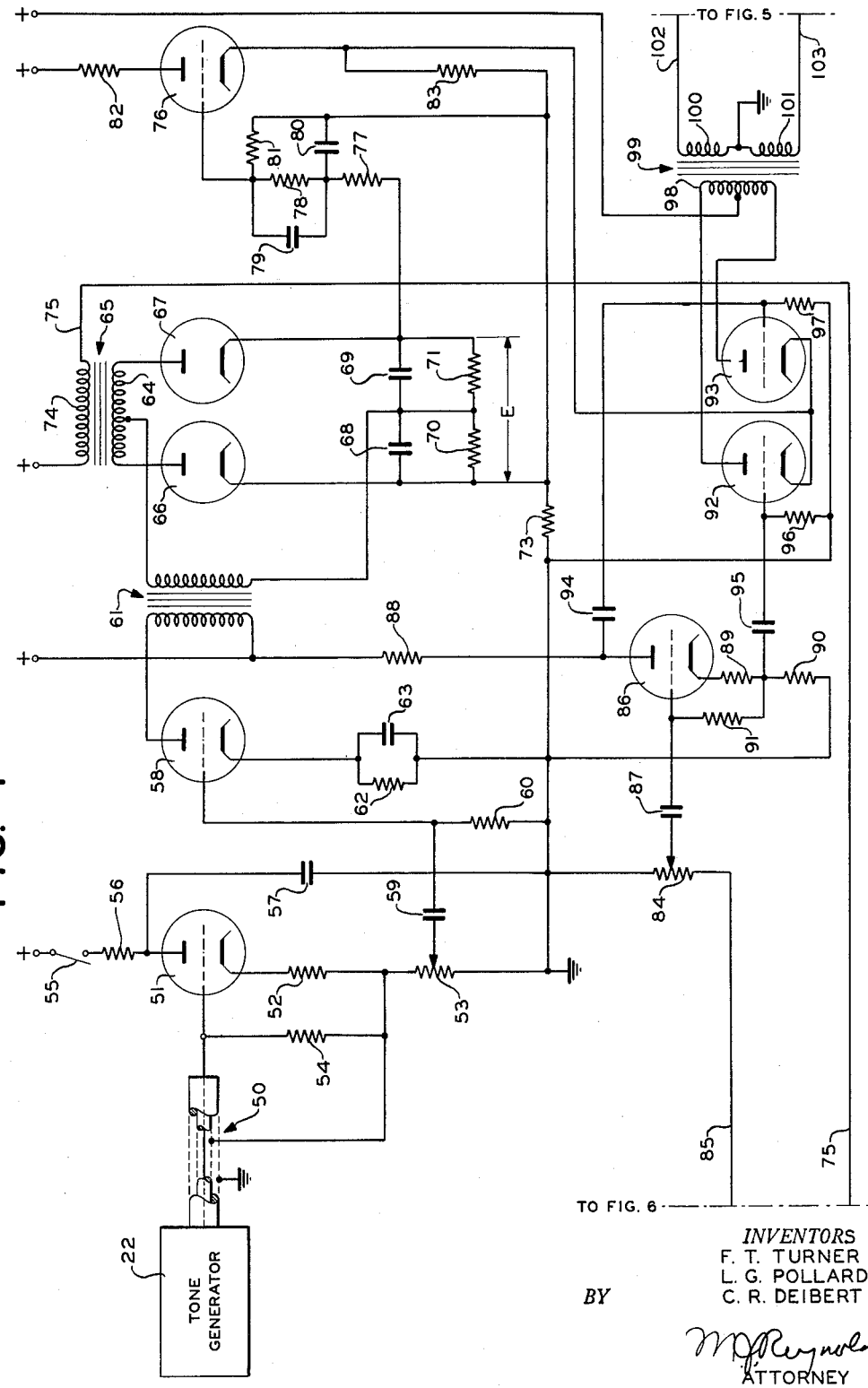
Fig. 4 illustrates in detail a motor stabilization circuit for use in the system shown in Fig. 1.

Referring now to Fig. 4, the rotor member of tone generator 22 is connected to the grounded outer shielding of a double shielded cable 50. Other arrangements could conveniently be constructed in which the stator member would be grounded. The center conductor of cable 50 interconnects the stator member of tone generator 22 and the control grid of an amplifier tube 51.

Tube 51 is connected in cathode follower circuit arrangement, the cathode thereof being coupled to ground through a resistor 52 and a potentiometer 53. A resistor 54 is connected between the control grid of tube 51 and the junction of resistor 52 and potentiometer 53. This junction is also connected to the inner shielding of cable 50. Since the inner shielding tends to float at a potential dependent on the cable conductor potential, capacity variations between the grid of tube 51 and ground produced by tone generator 22 are maximized. Use of a cathode follower input stage of this type, which inherently has a relatively high input impedance, permits matching of the amplifier input impedance to the output impedance of tone generator 22, which can be considered as a high impedance source. The potential applied through the cable conductor to resistor 54 serves as the operating voltage for the tone generator.

The anode of tube 51 is coupled to a source of positive potential through a switch 55 and a resistor 56 and is decoupled with respect to alternating currents through a capacitor 57. As will be described more fully hereinafter, stabilization of a synchronous motor may take place at any one of a number of discrete points determined by the motor poles and the tone generator teeth. In practice, it is desirable to allow the motor rotor to assume its mean angular position before applying the control. For this purpose, switch 55 is left in its open position until the motor comes up to speed and assumes its mean position. When switch 55 is closed, an operating potential is applied to the anode of tube 51. Resistor 56 and capacitor 57 function as a delay circuit to limit the rate of rise of anode potential on tube 51 and thus the rate of rise of control sensitivity. In this manner control is effected without a sharp initial shock which might produce undesirable oscillations of the rotor. The slider of potentiometer 53 is coupled to the control grid of a second amplifier tube 58 through a coupling capacitor 59, a resistor 60 being provided between the control grid of tube 58 and ground. The anode of tube 58 is coupled to a source of positive potential through the primary winding of an output transformer 61. Operating bias for tube 58 is provided by a cathode resistor 62 suitably by-passed by a capacitor 63.

One end of the secondary winding of transformer 61 is connected to the center tap of secondary winding 64 of a transformer 65. The ends of winding 64 are connected to respective anodes of a pair of diodes 66 and 67. The cathodes of diodes 66 and 67 are intercoupled by a pair of series connected capacitors 68 and 69 and by a pair of series connected resistors 70 and 71. The cathode of diode 66 is connected to ground through a resistor 73. The lower end of the secondary winding of transformer 61 is connected to the junction of capacitors 68 and 69. One end of primary winding 74 of transformer 65 is connected to a source of positive potential. The other end thereof is connected through a conductor 75 to a source of alternating current having a frequency of 1440 cycles. This latter 1440 cycle signal constitutes the standard signal and the phase thereof represents the ideal or desired relative angular position of the rotor of motor 20. The source of the 1440 cycle signal will be described in detail hereinafter in connection with Fig. 6.

The standard 1440 cycle signal is applied in phase opposition to the anodes of diodes 66 and 67 through transformer 65. The 1440 cycle signal from tone generator 22, which will hereinafter be termed the actual signal, is applied to the anodes of diodes 66 and 67 in phase coincidence. Tubes 66 and 67, together with their associated circuit elements, constitute a phase detector circuit. When the phases of the standard and actual signals are in quadrature, equal and opposite voltages will be developed across resistors 70 and 71. Any deviation from quadrature between the phases of the standard and actual signals, however, will cause unequal voltages to be produced across resistors 70 and 71. The magnitude and polarity of the resultant voltage E, which is proportional to the cosine of the phase angle between the standard and actual signals, will depend on the direction and magnitude of the phase difference. The magnitude of voltage E, which may be termed an error voltage, is proportional to the deviation in relative angular position of the rotor of motor 20 from the ideal position thereof. The polarity of voltage E indicates whether the positional error is leading or lagging.

Error voltage E is applied to the control grid of an amplifier tube 76 through resistors 77 and 78. Resistor 78 is included in a rate differentiating network comprising the parallel combination of resistor 78 and a capacitor 79, a capacitor 80 being connected to one end of resistor 78 and a resistor 81 being connected to the other end thereof. The free ends of capacitor 80 and resistor 81 are interconnected and coupled to ground through resistor 73. The rate differentiating network serves to provide a signal at the grid of tube 76 which is the sum of two signals, one proportional to the error voltage and the other proportional to the first derivative thereof. The current flow through tube 76 is therefore proportional to the magnitude and polarity of the error voltage and to the rate of change thereof. The differentiated voltage is employed to provide damping and thus suppress the hunting that would tend to occur as the motor rotor passed through its in phase condition. This hunting, which would be produced by mechanical inertia, is overcome by the opposing force produced by the differentiated voltage at the moment of registration.

The anode of tube 76 is coupled to a source of positive potential through a resistor 82, while the cathode thereof is coupled to ground through a resistor 83 and resistor 73. The voltage developed between the cathode of tube 76 and ground is proportional to the current flow through tube 76 and hence to the magnitude, polarity and rate of change of error voltage E.

Figure 6:
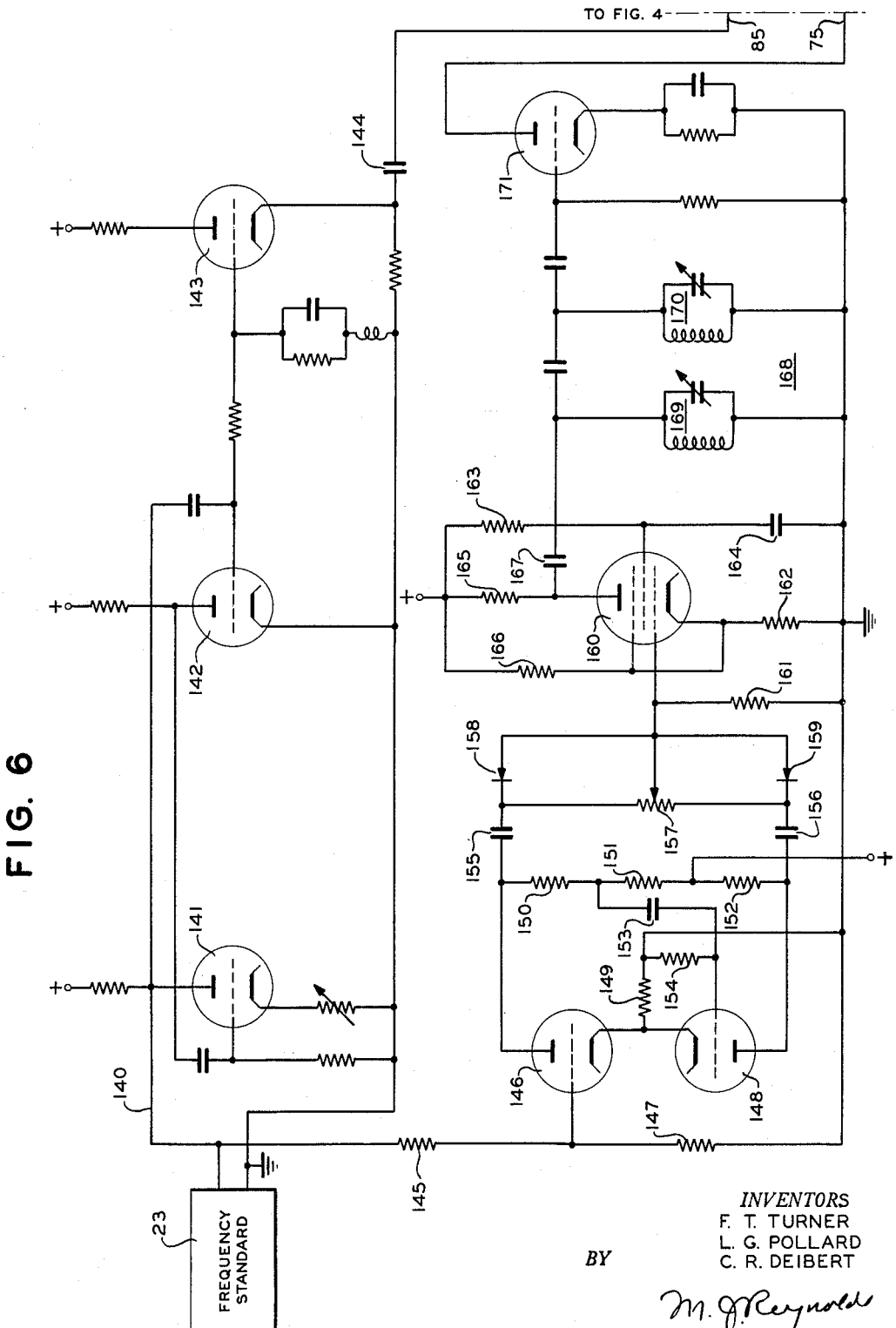
Fig. 6 shows a frequency source for use in the system of Fig. 1.

A 60 cycle voltage, from a source to be described hereinafter in connection with Fig. 6, is applied to a potentiometer 84 from a conductor 85. The slider of potentiometer 84 is coupled to the control grid of a phase inverting tube 86 through a coupling capacitor 87. The anode of tube 86 is coupled to a source of positive potential through a resistor 88. The cathode of tube 86 is coupled to ground through series connected resistors 89 and 90. The junction of resistors 89 and 90 is connected to the control grid of tube 86 through a resistor 91. The 60 cycle voltage appearing at the anode of tube 86 is substantially in phase opposition to the 60 cycle voltage appearing at the junction of resistors 89 and 90, so that these two voltages may serve as the input signals to the push-pull amplifier stage comprising tubes 92 and 93. For this purpose, the anode of tube 86 is coupled to the control grid of tube 93 through a coupling capacitor 94, while the junction of resistors 89 and 90 is coupled to the control grid of tube 92 through a coupling capacitor 95.

The control grids of tubes 92 and 93 are coupled to ground through resistors 96 and 97, respectively. The anodes of tubes 92 and 93 are connected to opposite ends of primary winding 98 of a transformer 99, the center tap of winding 98 being connected to a source of positive potential. The cathode of tubes 92 and 93 are connected to the cathode of tube 76, so that the operating points of tubes 92 and 93 are dependent on the potential between the cathode of tube 76 and ground. This latter potential, as was explained hereinbefore, is proportional to the magnitude, polarity and rate of change of the voltage E. Tubes 92 and 93 are adjusted to operate on portions of their characteristic curves at which the grain thereof varies with the grid bias, so that the gain of these tubes will vary in a sense to compensate for changes in relative angular position of the rotor of motor 20. More particularly, the output of push-pull amplifier tubes 92 and 93, after further amplification, is used to drive motor 20. If the rotor of motor 20 lags behind its ideal position, voltage E will vary in a sense to increase the gain of tubes 92 and 93, increasing the driving voltage of motor 20 and thereby causing the rotor to advance to its ideal position. Similarly, if the rotor leads its ideal relative position, voltage E will vary in a sense to decrease the gain of tubes 92 and 93, decreasing the driving voltage of motor 20 and thereby causing the rotor to lag to its ideal relative position. Because of the presence of the rate differentiating network at the input of tube 76, the gain of tubes 92 and 93 will also be varied as a function of the rate of change of relative rotor position, so that the rotor may be maintained substantially in the proper relative position. It should be noted that the rate differentiating network introduces into the control function a quantity having the dimension of resistance and hence introduces damping.

When the synchronous motor is brought up to speed, it will tend to assume a mean position relative to the rotating electric field. As has been noted above, any deviation from this mean position will produce an error voltage tending to return the rotor to its mean position. However, the final relative position of the rotor after the error voltage is reduced to zero will be one corresponding to a zero position in the tone generator output wave. The particular zero position assumed will depend on the slope of the tone generator output wave at the maximum deviation. If the slope at this point is positive, the rotor will be returned to a position corresponding to the adjacent zero point. If the slope is negative, the rotor will be returned to a position corresponding to the zero of the nearest positive slope. It is evident, therefore, that there are a number of discrete positions at which the error voltage will be zero, the number being determined by the number of teeth of the tone generator. In the example assumed, there are 48 teeth in each of the stator and rotor tone generator members. Hence there are 48 possible rotor relative positions at which no correction voltage will be produced and at which the system will operate stably.

The secondary of transformer 99 is split into two windings, 100 and 101. Transformer 99 serves to apply the amplified 60 cycle voltage from push-pull amplifier tubes 92 and 93 to the synchronous power amplifier illustrated in Fig. 5. For this purpose, the upper end of winding 100 and the lower end of winding 101 are coupled through conductors 102 and 103, respectively, to the respective control grids of a pair of amplifier tubes 104 and 105. The other ends of windings 100 and 101 are connected to ground.

The cathodes of tubes 104 and 105 are coupled to ground through resistors 106 and 107, respectively. The control grids of tubes 104 and 105 are intercoupled by a resistor 108. The anodes of tubes 104 and 105 are coupled through coupling capacitors 109 and 110, respectively, to the respective control grids of a pair of amplifier tubes 111 and 112. The anodes of tubes 104 and 105 are also coupled to a source of positive potential $P_1$ through resistors 113 and 114, respectively, and a resistor 115. The junction of resistors 113 and 114 is coupled to ground through a capacitor 116. The control grids of tubes 111 and 112 are coupled to ground potential through resistors 117 and 118, respectively, and the parallel combination of a resistor 119 and a capacitor 120.

The cathodes of tubes 111 and 112 are coupled to the respective control grids of tubes 121 and 122 through resistors 123 and 124, respectively. The cathodes of tubes 111 and 112 are also coupled to ground through a pair of resistors 125 and 126, respectively, a resistor 127 and the parallel combination of resistor 119 and capacitor 120. It is evident that tubes 111 and 112 are connected as cathode followers with respect to tubes 121 and 122, respectively. The grid bias of tubes 111, 112, 121 and 122 is determined in part by the current flow through resistor 119 in the cathode circuit of tubes 111 and 112 and in part by a negative biasing potential applied to the junction of resistors 125 and 126 from a source of negative potential $P_2$.

The screen grids of tubes 121 and 122 and the anodes of tubes 111 and 112 are connected to a source of positive potential $P_1$ and are coupled to ground potential with respect to alternating current by capacitors 128 and 129. The anodes of tubes 121 and 122 are coupled to opposite ends of a primary winding 130 of an output transformer 131. The center tap of winding 130 is connected to a source of positive potential $P_3$.

The anodes of tubes 121 and 122 are coupled, respectively, to the cathodes of tubes 104 and 105 in degenerative relationship at the operating frequency of 60 cycles. The negative feedback network for tubes 121 and 104 comprises a series combination of a resistor 132 and an isolating capacitor 133. The negative feedback network for tubes 122 and 105 comprises a series combination of a resistor 134 and an isolating capacitor 135.

The secondary winding 136 of transformer 131 is coupled to synchronous motor 20.

As has been pointed out hereinbefore, the relative angular position of the rotor of motor 20 is dependent on the driving voltage for motor 20. Accordingly, it is desirable that this driving voltage be kept substantially constant except for the compensating variations therein produced by changes in voltage E. To insure proper constancy of driving voltage, the operating potentials $P_1$, $P_2$ and $P_3$ for the synchronous power amplifier of Fig. 4 should be very closely regulated.

For proper operation of a facsimile system, the speed of motor 20 must be maintained constant. Since motor 20 is a synchronous motor, constant speed may conveniently be achieved by providing a constant frequency driving voltage source. The sources of the 60 cycle voltage applied to the synchronous power amplifier through conductor 85, tube 86 and tubes 92 and 93 of Fig. 4 and of the 1440 cycle signal applied to transformer 65 through conductor 75 of Fig. 4 are illustrated in Fig. 6.

Referring now to Fig. 6, a frequency standard 23, which might be, for instance, a tuning fork standard, serves as the source of the 60 and 1440 cycle currents employed in the circuit of Fig. 4. With the frequency relationships assumed, frequency standard 23 could conveniently provide a 240 cycle output. The 240 cycle output is applied through a conductor 140 to the anode of a tube 141. Tube 141 and a tube 142 are connected in a driven multivibrator circuit arrangement designed to provide an output frequency one-quarter times the input frequency. This 60 cycle output is derived from the grid circuit of tube 142 and is applied to the control grid of a cathode follower amplifier tube 143. The amplified 60 cycle voltage is derived from the cathode circuit of tube 143 and is applied, through a coupling capacitor 144 and conductor 85, to potentiometer 84 of Fig. 4.

The 240 cycle output of frequency standard 23 is also applied through a resistor 145 to the control grid of an amplifier tube 146. A resistor 147 is coupled between the grid of tube 146 and ground. The cathode of tube 146 is connected to the cathode of a phase inverting tube 148, the interconnected cathodes being coupled to ground through a biasing resistor 149. The anodes of tubes 146 and 148 are intercoupled through three series connected resistors 150, 151 and 152. The control grid of tube 148 is coupled to the junction of resistors 150 and 151 through a capacitor 153 and to ground through a resistor 154. The relative values of resistor 150 and of resistors 151 and 152 should be chosen so that the 240 cycle signal applied to the control grid of tube 148 is substantially in phase opposition to and of substantially equal magnitude to the 240 cycle signal applied to the control grid of tube 146. The junction of resistors 151 and 152 is connected to a source of positive potential.

The anodes of tubes 146 and 148 are connected through capacitors 155 and 156, respectively, to opposite ends of a potentiometer 157. The outer terminals of potentiometer 157 are coupled to the tapping thereof through a pair of similarly poled rectifier elements 158 and 159, thereby forming a frequency doubling circuit.

The 480 cycle output of the frequency doubler is applied to the control grid of a pentode amplifier tube 160. The control grid of tube 160 is coupled to ground through a resistor 161, while the cathode thereof is coupled to ground through a resistor 162. The screen grid of tube 160 is coupled to a source of positive potential through a resistor 163 and to ground through a capacitor 164. The anode of tube 160 is coupled to the source of positive potential through a resistor 165. The cathode and suppressor grid of tube 160 are coupled to the source of positive potential through a resistor 166. Resistors 166 and 162 form a voltage divider network arranged to place the cathode of tube 160 at a suitable potential for biasing the tube beyond cut-off. The operating point of tube 160, which is primarily determined by the cathode potential thereof, is preferably chosen so that the amplified output will contain a large third harmonic component of the applied 480 cycle signal.

The output of tube 160 is applied through a coupling capacitor 167 to a filter network 168. Network 168 comprises two parallel resonant circuits 169 and 170 each sharply tuned to 1440 cycles, which frequency is the third harmonic of the signal input to tube 160. Filter 168 serves to attenuate sharply all frequency components except 1440 cycles. The output of filter 168 is applied to the control grid of an amplifier tube 171, the output of which is, in turn, applied through conductor 75 to primary winding 74 of transformer 65 shown in Fig. 4.

Figure 5:
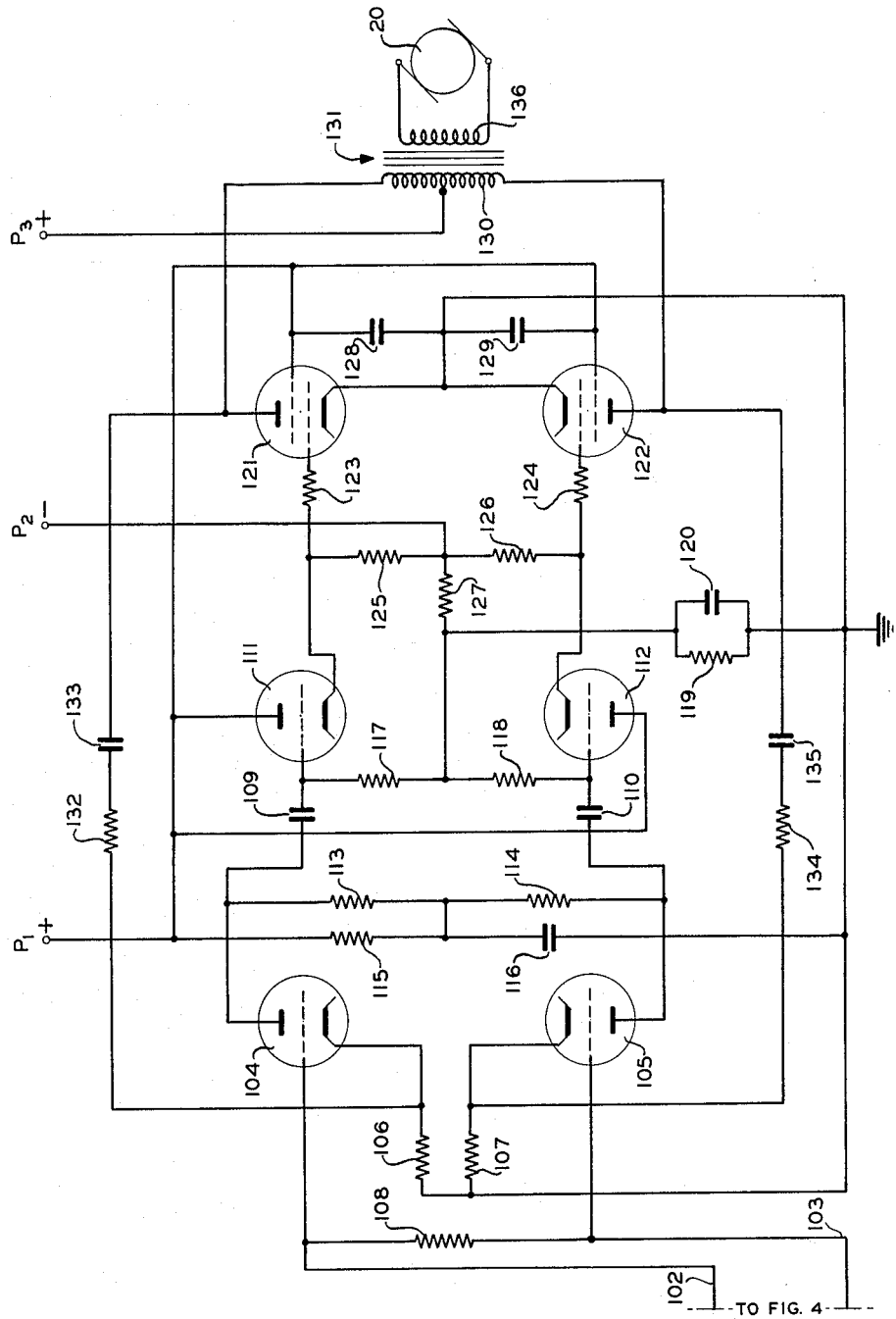
Fig. 5 illustrates a synchronous power amplifier for use in the system of Fig. 1.

The motor stabilization circuit illustrated in Figs. 4, 5 and 6 is concerned solely with the relative angular position of the rotor of motor 20. Constancy of speed is insured by providing a stable frequency source 23.

In a number of applications it is desirable that the motor operating speed be variable. For instance, where it is desired to transmit intelligence by facsimile over different communication channels, most efficient utilization will occur when the band width of the transmitting and receiving machines approximates the band width of the available channel. Since the band width required for transmission is dependent on the speed, a suitable adjustment of the speed of motor 20 will match the required band width to the available band width. To achieve such a change in speed, a variable speed motor, such as an induction motor, may conveniently be used. When a variable speed motor is used, satisfactory reproduction of copy requires very accurate control of motor speed as well as very accurate control of rotor relative angular position.

Figure 7:
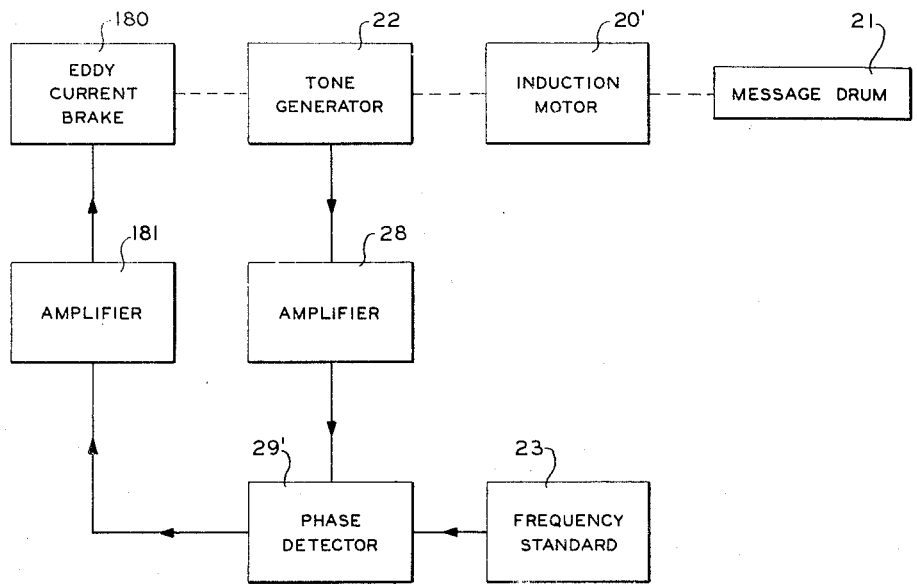
Fig. 7 illustrates another control system, in accordance with the invention, for use in a facsimile receiver.

A block diagram of a suitable facsimile transmitter or receiver motor control arrangement is illustrated in Fig. 7 wherein an induction motor 20' is arranged to drive a message drum 21, a tone generator 22 and an eddy current brake 180. In some types of facsimile apparatus, message drum 21 would be replaced by the scanning or stylus mechanism. Tone generator 22 may be identical with the generator illustrated in Figs. 2 and 3. Eddy current brake 180 will be described hereinafter in connection with Fig. 8.

Induction motor 20' may be driven directly from the A. C. mains.

The output of tone generator 22 is amplified in amplifier 28 and applied to a phase detector 29'. The output of frequency standard 23, which should have a frequency equal to the frequency provided by tone generator 22 at the desired operating speed, is also applied to detector 29'. The output of detector 29' is an error voltage proportional to the phase difference between the two signals applied thereto. The error voltage is amplified in an amplifier 181 and applied to eddy current brake 180 to vary the braking effect provided in a sense to reduce the phase difference between the two signals applied to detector 29'. The braking current should be adjusted initially to cause motor 20' to operate at a predetermined slip. Any changes in slip or in rotor relative angular position will cause an error voltage to be applied to brake 180 varying the braking action in a sense to compensate for the change in slip or relative position.

Figure 8:
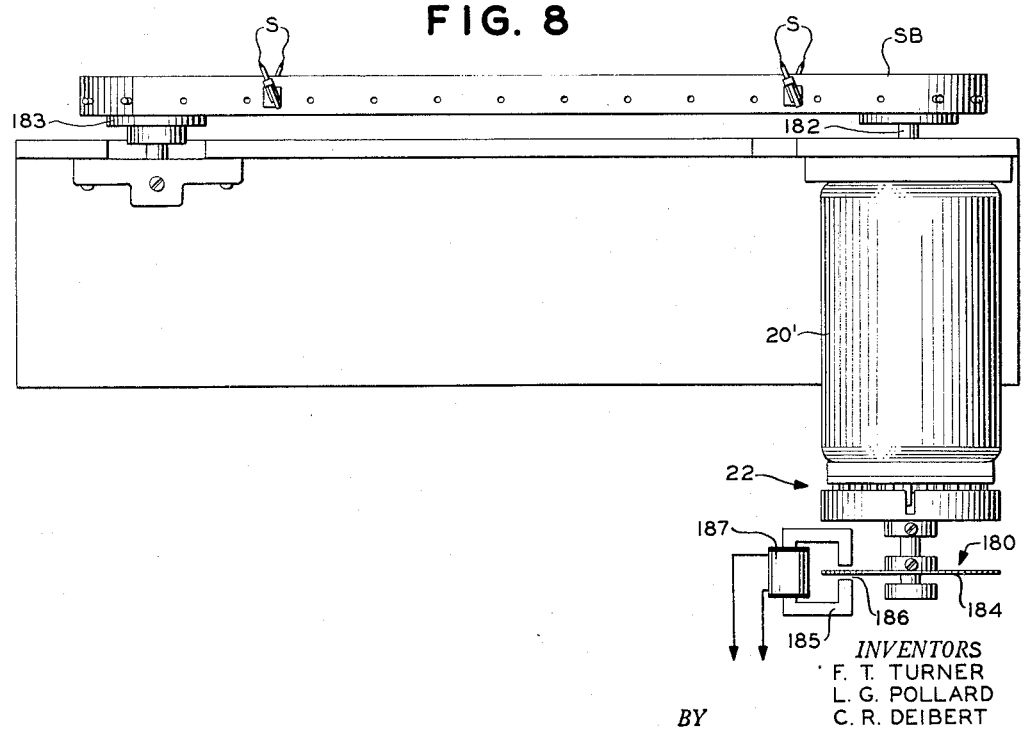
Fig. 8 illustrates a portion of the mechanical assembly of a facsimile receiver in accordance with the invention.

In Fig. 8, which illustrates a portion of the mechanical apparatus of a facsimile receiver according to the invention, there is shown an induction motor 20' arranged to drive a stylus belt SB through a shaft and pulley assembly 182. The opposite end of belt SB is supported by a pulley 183. Attached to belt SB are four recording styluses S. Motor 20' is also arranged to drive a tone generator 22 and an eddy current brake 180. Eddy current brake 180 comprises a conducting disk 184 fastened to the motor shaft and arranged to rotate therewith, a magnetic circuit 185 having a gap 186 including a portion of disk 184 and a coil 187 wound about a portion of magnetic circuit 185. The current in coil 187 produces a magnetic flux in circuit 185 and a magnetic field across gap 186. The magnetic field induces eddy currents in disk 184, which currents, reacting with the magnetic field, produce a loading effect on motor 20'. The loading effect produced will be proportional to the current flow in coil 187. The current flow in coil 187 is controlled in a manner to be described hereinafter in connection with Fig. 9. The arrangement illustrated in Fig. 8 could be used for a facsimile transmitter by replacing the stylus belt with a message drum as shown in Figs. 2 and 3 with suitable scanning apparatus.

In Fig. 9, which illustrates in detail a motor stabilization circuit of the type shown in Fig. 7, elements corresponding to elements in Fig. 4 are given like reference characters. The operation of the circuit of Fig. 9 from tone generator 22 to amplifier tube 76 is substantially the same as the operation of the corresponding portion of Fig. 4. The actual speed of rotation will be determined by the motor slip. The slip should be adjusted to produce the desired speed at a given load. The output frequency of generator 22 at this desired speed should be identical to the frequency supplied to detector 29' from frequency standard 23.

When motor 20' is operating at a speed other than the desired speed, the error voltage generated will have an alternating current component with a magnitude proportional to the instantaneous phase differences between the signals from tone generator 22 and frequency standard 23 and a frequency proportional to the frequency difference therebetween. Since the average value of an alternating current is zero, this component of the error voltage will produce no net change in rotor speed. However, when the angular velocity of motor 20' is changing slowly, the control circuit can take control thereof during the period when the frequencies are nearly equal. Since an induction motor running under a substantially constant load maintains a substantially constant speed, once the control circuit gains control over the motor speed, the operation of the system is satisfactory.

While the output of the phase detector is effectively a function of phase only and not of frequency, application of the error voltage to the differentiating network produces a component proportional to the rate of change of phase differences. However, since the rate of change of phase is the frequency, this latter component provides a control proportional to variations in rotor angular velocity. The control will be effective only for small frequency changes. Large frequency changes will cause a total phase change which will tend to carry the system beyond its operating range.

When rotation at the desired speed is produced, phase difference between the signals from tone generator 22 and frequency standard 23 caused by variations in rotor relative angular position will cause an error voltage portional to the phase difference and to the rate of change of phase to be applied to the grid of tube 76 in a sense to return the rotor to the proper relative angular position.

It is evident that, if the system is to be operable at more than one speed, different tone generators or different standard frequency outputs should be provided for each such speed.

It is not necessary that a frequency standard be provided at both transmitter and receiver. In lieu of a frequency standard at the receiver, a portion of the signal from the transmitter frequency standard may be transmitted to the receiver where the signal can be used in the same manner as a local standard.

While the invention has been described in specific embodiments thereof and in specific uses, it is not desired that it be limited thereto for obvious modifications thereof will occur to those skilled in the art without departing from the spirit and scope of the invention as set forth in the appended claims.

What is claimed is:

1. An electrical circuit arrangement for controlling the position of an electric motor rotor relative to the position of an ideal rotating electric field, comprising a source of a first signal having a frequency proportional to the angular velocity of said motor rotor and a phase proportional to the angular position of said motor rotor relative to the angular position of said ideal rotating field, said source of said first signal comprising a capacity tone generator having a stator member and having a rotating member driven by said electric motor, a source of a second signal having a frequency and phase proportional to the frequency and phase, respectively, of said ideal rotating field, a phase sensitive detector circuit, means to apply said first and second signals to said detector circuit thereby to produce an error voltage having a magnitude proportional to the phase difference between said signals and a polarity dependent on the time relationship between said signals, control means to adjust the angular position of said motor rotor relative to the angular position of said ideal rotating field, and means to apply said error voltage to said control means in a sense to maintain the relationships between the angular velocities and relative angular positions, respectively, of said motor rotor and ideal rotating field substantially constant.

2. An electrical circuit arrangement for controlling the position of an electric motor rotor relative to the position of an ideal rotating electric field, comprising a source of a first signal having a frequency proportional to the angular velocity of said motor rotor and a phase proportional to the angular position of said motor rotor relative to the angular position of said ideal rotating field, said source of said first signal comprising a capacity tone generator having a stator member and having a rotating member driven by said electric motor, a source of a second signal having a frequency and phase proportional to the frequency and phase, respectively, of said ideal rotating field, a phase sensitive detector circuit, means to apply said first and second signals to said detector circuit thereby to produce an error voltage having a magnitude proportional to the phase differences between said signals and a polarity dependent on the time relationship between said signals, means to derive from said error voltage a control voltage proportional to the rate of change of said error voltage, control means to adjust the angular position of said motor rotor relative to the angular position of said ideal rotating field, and means to apply said error voltage and said control voltage to said control means in a sense to maintain the relationships between the angular velocities and relative angular positions, respectively, of said motor rotor and ideal rotating field substantially constant.

3. An electrical circuit arrangement for controlling the position of an electric motor rotor relative to the position of an ideal rotating electric field comprising a tone generator having a serrate rotating member and a serrate stator member arranged in spaced relationship to provide a capacitance varying with changes in relative position of said rotating and stator members, means to produce a potential difference between said rotating and stator members and means intercoupling said rotating member and said motor rotor whereby a first signal is produced between said rotating and stator members, said first signal having a frequency proportional to the angular velocity of said motor rotor and a phase proportional to the angular position of said motor rotor relative to the angular position of said ideal rotating field, a source of a second signal having a frequency and phase proportional to the frequency and phase, respectively, of said ideal rotating field, a phase sensitive detector circuit, means to apply said first and second signals to said detector circuit thereby to produce an error voltage having a magnitude proportional to the phase differences between said signals and a polarity dependent on the time relationship between said signals, control means to adjust the angular position of said motor rotor relative to the angular position of said ideal rotating field, and means to apply said error voltage to said control means in a sense to maintain the relationships between the angular velocities and relative angular positions, respectively, of said motor rotor and ideal rotating field substantially constant.

4. An electrical circuit arrangement for controlling the position of a synchronous electric motor rotor relative to the position of the rotating electric field thereof, comprising a source of a first signal having a phase proportional to the instantaneous angular position of said motor rotor, said source of said first signal comprising a capacity tone generator having a stator member and having a rotating member driven by said electric motor, a source of alternating current, a modulator coupled to said source of alternating current, a power amplifier intercoupling said modulator and said electric motor thereby to produce said rotating electric field in said electric motor, means to derive from said alternating current source a second signal having a frequency equal to the frequency of said first signal and a phase proportional to the instantaneous angular position of said rotating field, a phase sensitive detector circuit, coupling means including a cathode follower amplifier to apply said first signal to said detector circuit, means to apply said second signal to said detector circuit thereby to produce an error voltage having a magnitude proportional to the phase difference between said first and second signals and a polarity dependent on the time relationship between said first and second signals, and means to apply said error voltage to said modulator to vary the gain thereof in a sense to adjust the angular position of said motor rotor whereby the relationship between the angular positions of said motor rotor and said rotating electric field are maintained substantially constant.

5. An electrical circuit arrangement for controlling the position of a synchronous electric motor rotor relative to the position of the rotating electric field thereof, comprising a source of a first signal having a phase proportional to the instantaneous angular position of said motor rotor, said source of said first signal comprising a capacity tone generator having a stator member and having a rotating member driven by said electric motor, a source of alternating current, a modulator coupled to said source of alternating current, a power amplifier intercoupling said modulator and said electric motor thereby to produce said rotating electric field in said electric motor, means to derive from said alternating current source a second signal having a frequency equal to the frequency of said first signal and a phase proportional to the angular position of said rotating field, a phase sensitive detector circuit, means to apply said first and second signals to said detector circuit thereby to produce a first error voltage having a magnitude proportional to the phase difference between said first and second signals and a polarity dependent on the time relationship between said first and second signals, means to derive from said first error voltage a second error voltage having a value proportional to the rate of change of said first error voltage, and means to apply said first and second error voltages to said modulator to vary the gain thereof in a sense to adjust the angular position of said motor rotor whereby the relationship between the angular positions of said motor rotor and said rotating electric field are maintained substantially constant.

6. An electrical circuit arrangement for controlling the position of a synchronous electric motor rotor relative to the position of the rotating electric field thereof, said relative positions being sensitive to changes in bearing friction, load and driving voltage of said electric motor, comprising a source of a first signal having a phase proportional to the instantaneous angular position of said motor rotor, said source of said first signal comprising a tone generator having a stator member and having a rotating member driven by said electric motor, a source of alternating current, a modulator coupled to said source of alternating current, a power amplifier intercoupling said modulator and said electric motor thereby to apply said alternating current to said electric motor as a driving voltage and to produce said rotating electric field in said electric motor, means to derive from said alternating current source a second signal having a frequency equal to the frequency of said first signal and a phase proportional to the angular position of said rotating field, a phase sensitive detector circuit, coupling means including a high impedance network coupled to the output of said tone generator to apply said first signal to said detector circuit, means to apply said second signal to said detector circuit thereby to produce an error voltage having a magnitude proportional to the phase difference between said first and second signals and a polarity dependent on the time relationship between said first and second signals, and means to apply said error voltage to said modulator to vary the gain thereof thereby to vary the magnitude of said driving voltage in a sense to adjust the angular position of said motor rotor whereby the relationship between the angular positions of said motor rotor and said rotating electric field are maintained substantially constant.

7. An electrical circuit arrangement for controlling the position of a synchronous electric motor rotor relative to the position of the rotating electric field thereof, said relative positions being sensitive to changes in bearing friction, load and driving voltage of said electric motor, comprising a source of a first signal having a phase proportional to the instantaneous angular position of said motor rotor, a source of alternating current, a modulator coupled to said source of alternating current, a power amplifier intercoupling said modulator and said electric motor thereby to apply said alternating current to said electric motor as a driving voltage and to produce said rotating electric field in said electric motor, means to derive from said alternating current source a second signal having a frequency equal to the frequency of said first signal and a phase proportional to the angular position of said rotating field, a phase sensitive detector circuit, means to apply said first and second signals to said detector circuit thereby to produce a first error voltage having a magnitude proportional to the phase difference between said first and second signals and a polarity dependent on the time relationship between said first and second signals, means to derive from said first error voltage a second error voltage having a value proportional to the rate of change of said first error voltage, and means to apply said first and second error voltages to said modulator to vary the gain thereof thereby to vary the magnitude of said driving voltage in a sense to adjust the angular position of said motor rotor whereby the relationship between the angular positions of said motor rotor and said rotating electric field are maintained substantially constant.

8. An electrical circuit arrangement for controlling the position of an electric motor rotor relative to the position of an ideal rotating electric field, said electric motor having a speed dependent on the load coupled thereto, comprising a source of a first signal having a frequency proportional to the angular velocity of said motor rotor and a phase proportional to the instantaneous angular position of said motor rotor, said source of said first signal comprising a capacity tone generator having a stator member and having a rotating member driven by said electric motor, a source of a second signal having a frequency and phase proportional, respectively, to the frequency and phase of said ideal rotating electric field, a phase sensitive detector circuit, means to apply said first and second signals to said detector circuit thereby to produce an error voltage having a magnitude proportional to the phase differences between said first and second signals and a polarity dependent on the time relationship between said signals, voltage responsive control means coupled to said motor rotor to adjust the load thereon, and means to apply said error voltage to said control means in a sense to vary the load on said motor rotor whereby the relationships between the angular velocities and relative angular positions, respectively, of said motor rotor and said ideal rotating electric field are maintained substantially constant.

9. An electric circuit arrangement for controlling the position of a variable speed electric motor rotor relative to the position of an ideal rotating electric field, said electric motor having a speed dependent on the load coupled thereto, comprising a source of a first signal having a frequency proportional to the angular velocity of said motor rotor and a phase proportional to the instantaneous angular position of said motor rotor, said source of said first signal comprising a capacity tone generator having a stator member and having a rotating member driven by said electric motor, a source of a second signal having a frequency and phase proportional, respectively, to the frequency and phase of said ideal rotating electric field, a phase sensitive detector circuit, means to apply said first and second signals to said detector circuit thereby to produce a first error voltage having a magnitude proportional to the phase differences between said first and second signals and a polarity dependent on the time relationship between said signals, means to derive from said first error voltage a second error voltage proportional to the rate of change of said first error voltage, voltage responsive control means coupled to said motor rotor to adjust the load thereon, and means to apply said first and second error voltages to said control means in a sense to vary the load on said motor rotor whereby the relationship between the angular velocities and relative angular positions, respectively, of said motor rotor and said ideal rotating electric field are maintained substantially constant.

10. An electrical circuit arrangement for controlling the position of a variable slip alternating current motor rotor relative to the position of an ideal rotating electric field, comprising a source of a first signal having a frequency proportional to the angular velocity of said motor rotor and a phase proportional to the instantaneous angular position of said motor rotor, said source of said first signal comprising a capacity tone generator having a stator member and having a rotating member driven by said alternating current motor, a source of a second signal having a frequency and phase proportional, respectively, to the frequency and phase of said ideal rotating electric field, a phase sensitive detector circuit, means to apply said first and second signals to said detector circuit thereby to produce an error voltage having a magnitude proportional to the phase differences between said first and second signals and a polarity dependent on the time relationship between said signals, an eddy current brake having a rotating member coupled to said motor rotor to adjust the slip thereof, and means to apply said error voltage to said eddy current brake in a sense to vary the slip of said motor rotor whereby the relationships between the angular velocities and relative angular positions, respectively, of said motor rotor and said ideal rotating electric field are maintained substantially constant.

11. An electrical circuit arrangement for controlling the position of a variable slip alternating current motor rotor relative to the position of an ideal rotating electric field, comprising a source of a first signal, said source of said first signal comprising a capacitive tone generator having a first rotating member coupled to said motor rotor whereby said first signal is given a frequency proportional to the angular velocity of said motor rotor and a phase proportional to the instantaneous angular position of said motor rotor, a source of a second signal having a frequency and phase proportional, respectively, to the frequency and phase of said ideal rotating electric field, a phase sensitive detector circuit, means to apply said first and second signals to said detector circuit thereby to produce an error voltage having a magnitude proportional to the phase differences between said first and second signals and a polarity dependent on the time relationship between said first and second signals, an eddy curent brake having a second rotating member coupled to said motor rotor to adjust the slip thereof, and means to apply said error voltage to said eddy current brake in a sense to vary the slip of said motor rotor whereby the relationships between the angular velocities and relative angular positions, respectively, of said motor rotor and said ideal rotating electric field are maintained substantially constant.

12. An electrical circuit arrangement for controlling the position of an electric motor rotor relative to the position of an ideal rotating electric field, comprising a source of a first signal having a frequency proportional to the angular velocity of said motor rotor and a phase proportional to the angular position of said motor rotor relative to the angular position of said ideal rotating field, said source of said first signal comprising a tone generator of high output impedance having a stator member and having a rotating member driven by said electric motor, a source of a second signal having a frequency and phase proportional to the frequency and phase, respectively, of said ideal rotating field, a phase sensitive detector circuit, means to apply said first and second signals to said detector circuit thereby to produce an error voltage having a magnitude proportional to the phase difference between said signals and a polarity dependent on the time relationship between said signals, said means including means having a low input impedance relative to the output impedance of said tone generator and a cathode follower amplifier coupling said tone generator to said low input impedance means, control means to adjust the angular position of said motor rotor relative to the angular position of said ideal rotating field, and means to apply said error voltage to said control means in a sense to maintain the relationships between the angular velocities and relative angular positions, respectively, of said motor rotor and ideal rotating field substantially constant.

13. An electrical circuit arrangement as defined in claim 12 in which the electric motor has a speed dependent upon the load coupled thereto and the control means is coupled to said motor rotor to adjust the load thereon.

14. An electrical circuit arrangement as defined in claim 13 comprising means to derive from said error voltage a second error voltage proportional to the rate of change of said first named error voltage and means to apply said second error voltage to said control means.

References Cited in the file of this patent

UNITED STATES PATENTS

| | | |
|---|---|---|
| 1,749,314 | Schappmann et al. | Mar. 4, 1930 |
| 1,767,236 | Bock et al. | June 24, 1930 |
| 1,991,066 | Staege | Feb. 12, 1935 |
| 2,050,624 | Morton | Aug. 11, 1936 |
| 2,247,783 | Massolle | July 1, 1941 |
| 2,351,759 | Grundmann | June 20, 1944 |
| 2,351,760 | Beers | June 20, 1944 |
| 2,399,421 | Artzt | Apr. 30, 1946 |
| 2,403,921 | Hallborg et al. | July 16, 1946 |
| 2,417,868 | Glass | Mar. 25, 1947 |
| 2,437,690 | Goldmark | Mar. 16, 1948 |
| 2,466,756 | White | Apr. 12, 1949 |
| 2,471,916 | Voltz | May 31, 1949 |
| 2,509,730 | Dome | May 30, 1950 |